United States Patent [19]
Slopsema

[11] Patent Number: 5,640,937
[45] Date of Patent: Jun. 24, 1997

[54] AIR INDUCTION ASSEMBLY

[75] Inventor: Thomas Alan Slopsema, DeWitt, Mich.

[73] Assignee: General Motors Corporation, Detroit, Mich.

[21] Appl. No.: 358,115

[22] Filed: Dec. 19, 1994

[51] Int. Cl.[6] ........................................... F02B 77/00
[52] U.S. Cl. ........................ 123/198 E; 55/385.3
[58] Field of Search .................. 123/198 E; 55/385.3

[56] References Cited

U.S. PATENT DOCUMENTS 4,619,677  10/1986  Matheson et al. .................. 55/385.3

Primary Examiner—Noah P. Kamen
Attorney, Agent, or Firm—Karl F. Barr, Jr.

[57] ABSTRACT

An air induction system for an internal combustion engine is disclosed. The system includes a housing having a closed end, walls extending from the housing end, and an open end. The open end has a flanged perimeter with a hollow cross section in a portion thereof. The system also may include integral stiffening ribs extending along portions of the walls and the closed end. The stiffening ribs having hollow base portions which operate to minimize depressions caused by the ribs on the sides of the walls opposite the ribs. The hollow base portions allow an increase in rib height and, as such, rib stiffness over typical solid ribs. The hollow cross section perimeter and enlarged stiffener ribs operate to define the area moment of inertia of the housing member.

2 Claims, 1 Drawing Sheet

AIR INDUCTION ASSEMBLY

TECHNICAL FIELD

The present invention relates to air induction systems for internal combustion engines.

BACKGROUND

Air induction systems for automotive applications of internal combustion engines should attenuate induction noise and filter the incoming air with minimal system restriction. Internal combustion engines, particularly those having four cylinders, may create significant low frequency induction noise. The noise, generated at the valves and inside the combustion chambers, is transmitted through the intake manifold, throttle body, air inlet ducting, air cleaner and the air inlet snorkel. The high energy noise, combined with air pulsations residing in the induction system, may impart vibration to the induction system components resulting in surface radiated noise. Such driving energy, which generates such surface noise, is typically in the range of 20 to 420 Hz.

When the driving energy frequency closely matches a natural frequency of an induction system component surface, the surface may resonate, emitting undesirable resonance noise. To reduce or eliminate noise generated by surface resonance, induction component structures should be sufficiently stiffened to ensure that the components first natural frequency is above the range of the driving energy generated in the induction system. The first natural frequency target must be met for underhood temperature conditions. For plastic components, stiffness drops at high temperature due to a shift in the modulus of elasticity of the plastic with increasing temperature.

A typical method for achieving high stiffness to increase natural frequency values is to locate stiffening ribs perpendicular to the surface being addressed. The stiffening ribs increase the area moment of inertia in the direction of vibration. Automotive design constraints, however, limit the usefulness of the ribs as a solution to such vibration. Typical stiffening ribs, located on the inside of the component surface, are height limited. Beyond height limits defined by the material, "sink" marks in the component exterior surface appear. Such surface imperfections have an unacceptable appearance quality. In addition, placement of ribs on the exterior of the component surface is typically not an option due to packaging limitations requiring maximization of component internal volumes for the purpose of acoustical noise attenuation. Structural ribs located on outside part surfaces force the component walls to be shifted inwardly, assuming fixed component exterior dimensions, thereby decreasing internal volumes.

Exotic materials and complex component surface configurations are also options to increase part surface stiffness. These solutions are unacceptable in that material and tooling costs are unacceptably high.

SUMMARY

Accordingly, the present invention relates to an air induction system for an internal combustion engine which maximizes component surface stiffness through the use of hollow-formed stiffening members. The stiffening members are formed during part molding using a process such as nitrogen gas assisted injection molding. A hollow, box section filter flange may be used, for instance, to replace a typical single-layer flange located along the top of the air cleaner box side walls. The filter flange stiffness benefits from the box section while critical filter flange surface flatness is maintained. In addition, stiffening ribs having hollow base sections are incorporated along component interior surfaces. The hollow base sections eliminate external sink marks and support rib heights which exceed those of typical solid ribs.

The details, as well as other features and advantages of the present invention are set forth in the following detailed description and drawings.

DESCRIPTION OF THE PREFERRED EMBODIMENT

Figure 1:
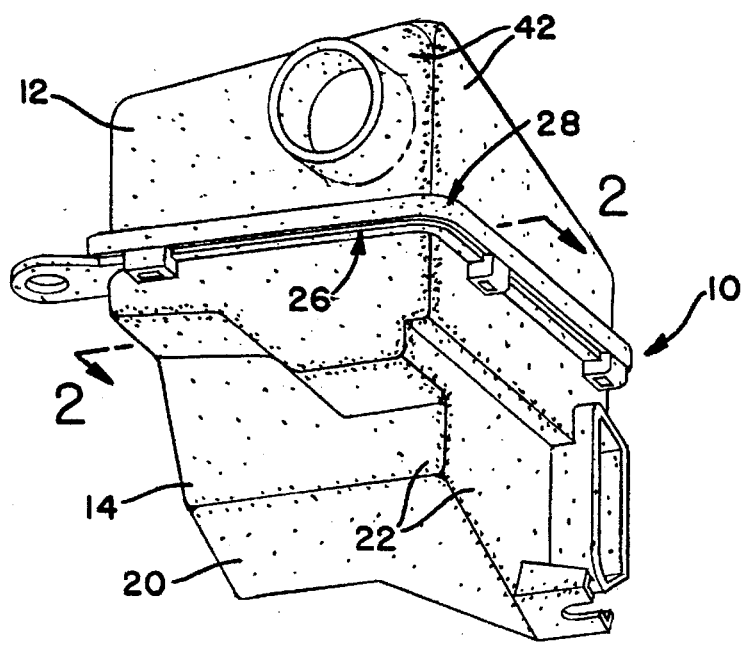
FIG. 1 is a perspective view of an air filter housing of an air induction system incorporating features of the present invention.
Figure 2:
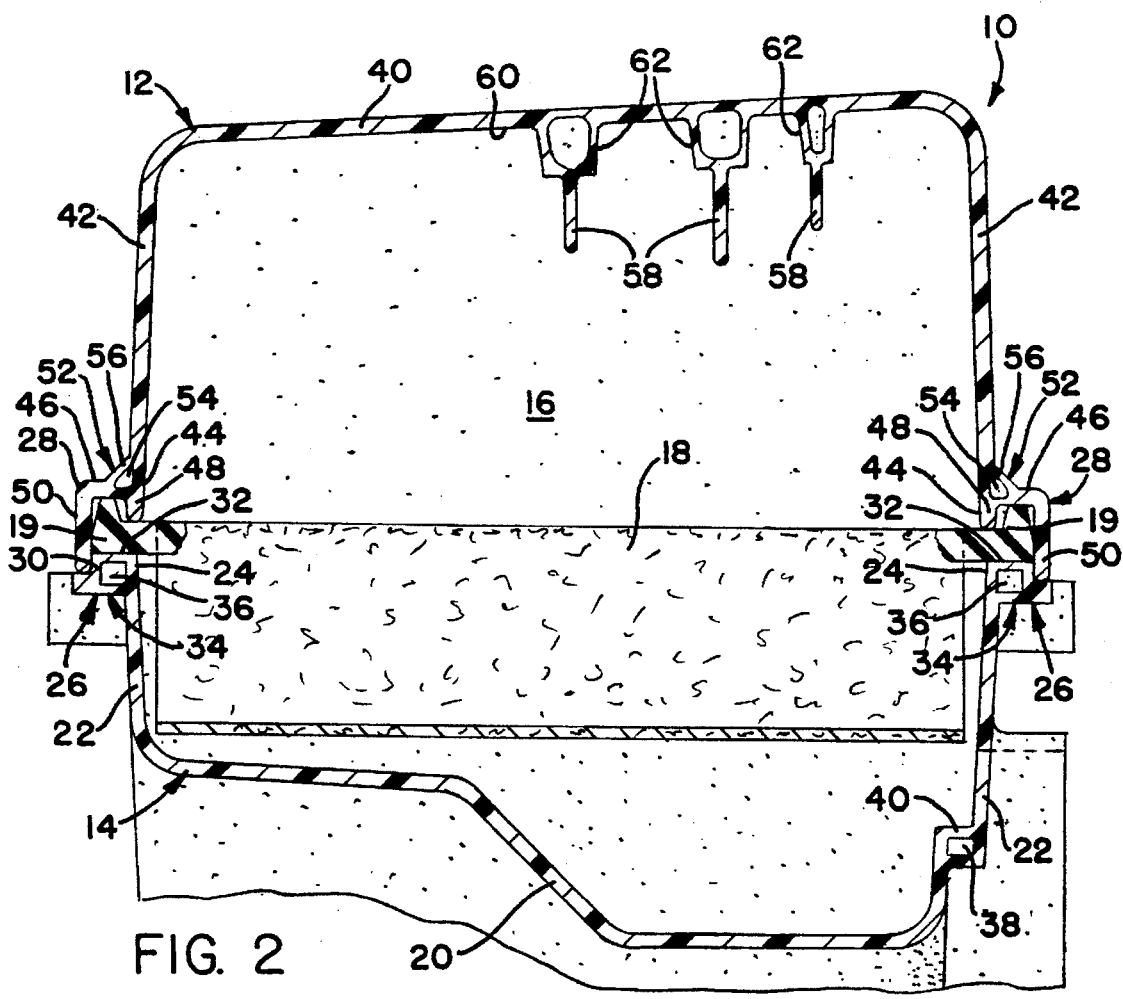
FIG. 2 is a sectional view of the filter housing taken along line 2—2 of FIG. 1.

Referring to FIGS. 1 and 2, there is illustrated an air filter housing 10 of an air induction system (not shown) for conducting air to the intake of an internal combustion engine. The air filter housing includes housing members 12 and 14, respectively. The two housing members 12 and 14 cooperate to define an interior space 16 in which is disposed an air filer element 18 through which intake air passes, and is cleaned, prior to its entry into the engine. Housing member 14 includes a bottom 20 and sides 22 which cooperate to define an open top having an open perimeter 24. The open perimeter 24 has an outwardly extending flange 26 which cooperates with a corresponding flanged portion 28 of housing member 12 to position the two members, relative to one another, when the air filter housing 10 is assembled. A shoulder 30 extends from the flange 26 to terminate in a flat land, or filter gasket surface 32. The land 32 extends about the open perimeter 24 of the housing member 14 and is operable to support the filter element gasket 19 of the air filter element 18 thereon. In order to provide the flanged edge 26 of the housing member 14 with the requisite stiffness, the edge is constructed as a hollow-formed stiffening member defined by a box section 34, FIG. 2, which includes the outwardly extending flange 26 as the bottom side of the section, the shoulder 24 as a first side of the section, the filter flange surface 32 as the top side of the section and side 22 of the housing 14 as a second side of the section. The box section 34 is formed during molding of the lower housing member. The molding process may utilize nitrogen gas assisted injection molding to define the hollow channel 36 of the box section 34. As a result of the box section 34 disposed within the perimeter 24 of the housing member 14, a significant increase in the area moment of inertia at a location of significant panel deflection, the open housing perimeter, can be recognized. In addition to the location of a hollow-formed section in the perimeter of a housing member, a similar hollow-formed section 38 can be located within walls 22 when a wall configuration necessitates stiffening. As shown in FIG. 2, hollow-formed section 38 is located as part of shoulder 40 so as to significantly increase the stiffness of side 22.

The housing member 12 of air filter housing 10 includes a top 40 and sides 42 which cooperate to define an open bottom having a flanged perimeter 44 which is configured to cooperate with the flanged perimeter 36 of the housing member 14 to close air filter housing 10 and define interior space 16. The flanged perimeter includes a surface 46 which extends parallel to land 32 of housing member 14 and inner and outer lips 48 and 50. Stiffening of the flanged perimeter 44 is through the placement of a hollow-formed stiffening channel 52 at the junction of the outwardly extending surface 46 and wall 42. The channel 52 defines a hollow section 54 and an angled brace 56 which extend about the unconstrained perimeter 44, adding to its stiffness and resistance to vibration caused by energy generated within the induction system.

In the present embodiment, housing member 14 includes significant surface shaping, see FIG. 1, due to the constraints of a closely packaged automotive application. These variations in shape are effective in stiffening the walls and bottom of the housing member against vibration. In contrast, variation in the outer surface of the housing member 12 is limited, resulting in a top and sidewalls which are prone to vibration and, as a result, require the incorporation of stiffening ribs 58 to increase the resistance to flexibility of these surfaces. The stiffening ribs 58, illustrated in FIG. 2, are preferably located on the inside surface 60 of the housing member 12. Vehicle packaging constraints dictate that the ribs be located inside of the housing. Typically, rib area moment of inertia increases by an exponential function with the rib height. As such, rib height may be critical in achieving a desired panel stiffness. In the ribs 58 located on top panel 40, a hollow-formed, rib base section 62 facilitates an increased rib height. The hollow rib base section 62 of the ribs 58 prevents the formation of sink marks on the exterior of the housing member and, as such, typical maximum limits for rib height can be exceeded and stiffness increased. Nitrogen gas assisted injection molding may be utilized in the manufacture of the hollow rib base 62.

The present invention discloses an air induction system component having a structure which is stiffened through the use of hollow structural sections incorporated within various panels. The hollow structural sections sufficiently stiffen the structure such that the natural frequency of the component is increased beyond the frequency range of high energy noise generated within the intake system of an internal combustion engine. As a result of these sections, surface vibrations caused by the high energy induction system noise are reduced, resulting in a corresponding reduction in surface radiated noise from the component, while meeting external dimensional and surface quality requirements. The hollow structural sections are preferably formed using a nitrogen gas assisted injection process during molding of the system component.

The embodiments of the invention in which an exclusive property or privilege is claimed are defined as follows.

The invention claimed is:

1. An air induction system for an internal combustion engine comprising a housing having a closed end, walls coextensive with said closed end and an open end, said open end having a flanged perimeter including a hollow cross section in a portion thereof, said hollow cross section operable to define the area moment of inertia of said flanged perimeter.

2. An air induction system for an internal combustion engine comprising a housing having a wall defining inner and outer surfaces, said inner surface including an integral stiffening rib extending into said housing and comprising a hollow section formed at the base thereof said hollow section operable to minimize depressions in said outer surface resulting from said integral stiffening rib.

* * * * *